United States Patent
Mori et al.

(10) Patent No.: US 8,379,310 B2
(45) Date of Patent: Feb. 19, 2013

(54) SUNLIGHT COLLECTING SYSTEM

(75) Inventors: Nobuyoshi Mori, Hachioji (JP); Takuji Hatano, Suita (JP); Setsuo Tokuhiro, Tokorozawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 475 days.

(21) Appl. No.: 12/740,612

(22) PCT Filed: Oct. 27, 2008

(86) PCT No.: PCT/JP2008/069449
§ 371 (c)(1),
(2), (4) Date: Apr. 29, 2010

(87) PCT Pub. No.: WO2009/057552
PCT Pub. Date: May 7, 2009

(65) Prior Publication Data
US 2010/0243032 A1    Sep. 30, 2010

(30) Foreign Application Priority Data
Nov. 2, 2007  (JP) ................. 2007-286676

(51) Int. Cl.
*G02B 1/10* (2006.01)
(52) U.S. Cl. ........ 359/584; 136/246; 359/585; 359/851; 359/853
(58) Field of Classification Search .................. 359/359, 359/360, 584, 585, 589, 851, 853; 136/246, 136/256, 257, 259; 126/680, 681, 684–691
See application file for complete search history.

(56) References Cited

U.S. PATENT DOCUMENTS

| | | | | |
|---|---|---|---|---|
| 4,153,474 A * | 5/1979 | Rex | .............. | 136/246 |
| 4,209,222 A * | 6/1980 | Posnansky | .............. | 359/359 |
| 4,487,196 A * | 12/1984 | Murphy | .............. | 126/690 |
| 4,963,012 A * | 10/1990 | Tracy et al. | .............. | 359/514 |
| 5,177,396 A * | 1/1993 | Gielen et al. | .............. | 313/113 |
| 6,128,126 A * | 10/2000 | Hohenegger et al. | .............. | 359/360 |
| 6,275,332 B1 * | 8/2001 | Hohenegger et al. | .............. | 359/360 |
| 7,905,227 B2 * | 3/2011 | Luconi et al. | .............. | 126/696 |
| 7,975,685 B2 * | 7/2011 | Zhao | .............. | 126/683 |

(Continued)

FOREIGN PATENT DOCUMENTS

| | | |
|---|---|---|
| JP | 82459/1981 | 7/1981 |
| JP | 10-73705 | 3/1998 |
| JP | 11-119105 | 4/1999 |
| JP | 2007-65232 | 3/2007 |

*Primary Examiner* — Frank Font
(74) *Attorney, Agent, or Firm* — Cozen O'Connor

(57) ABSTRACT

Provided is a highly reliable solar collecting system. Since a concave mirror has a reflection film on a base material on the side opposite to the side of a solar light incoming surface, peeling, breaking and the like are suppressed by protecting the reflection film by the base material, even when a dropping material is brought into contact with the side of the reflection film with impact or accumulated dropped materials are periodically cleaned. As an elliptical mirror has a reflection film on the base material on the side of the solar light incoming surface, even when solar light having large energy enters, the solar light is reflected by the reflection surface before reaching the base material and there is a small possibility of having the base material heated.

7 Claims, 16 Drawing Sheets

U.S. PATENT DOCUMENTS

2007/0062195 A1* 3/2007 Walpita .................. 60/641.15
2009/0179139 A1* 7/2009 Hines et al. ............. 250/203.4
2011/0030672 A1* 2/2011 Olsson ..................... 126/574
2011/0085257 A1* 4/2011 O'Connor et al. ........... 359/868
2011/0203573 A1* 8/2011 Hollis et al. ............... 126/595
2012/0042932 A1* 2/2012 Wylie et al. ............... 136/246

* cited by examiner

SUNLIGHT COLLECTING SYSTEM

RELATED APPLICATIONS

This is a U.S. National Phase Application under 35 U.S.C. 371 of International Application PCT/JP2008/069449, filed on Oct. 27, 2008.

This application claims the priority of Japanese Application No. 2007-286676 filed on Nov. 2, 2007, the entire content of which is hereby incorporated by reference.

TECHNICAL FIELD

The present invention relates to a sunlight collecting system, in particular, to a sunlight collecting system to collect light by reflecting sunlight and to generate energy.

BACKGROUND ART

Thermal power generation which burns fossil fuel and generates electric power has comparatively low facility cost and the restriction for the installation of an electric power plant is not sever, thermal power generation has been widely used all over the world. Incidentally, the amount of emission of CO2 (carbon dioxide) to cause global warming is increasing continuously every year, therefore, there is the actual circumstances that the reduction of CO2 becomes urgent requirement from a viewpoint of global environment protection. Moreover, since an amount of fossil fuel is limited, fossil fuel should be utilized with saving so as not to be depleted before an energy production technique taking a position of thermal power generation is established. For this reason, although other electric power generating techniques to supplement thermal power generation have been sought, there is a problem that nuclear power generation and hydraulic power generation are hard to be utilized, because the installation of their electric power plants is restricted.

On the other hand, as clean energy which does not give a load to the environment, sunlight energy attracts attention. Generally as a method of changing sunlight into energy, a solar battery has been well known. However, with a current technique, there is the actual circumstance that the electric power generating cost of a solar battery is relatively high in comparison with other plants.

In contrast to this, it has been also considered that sunlight is used directly as energy at relatively low cost. Patent Document 1 discloses a technique that sunlight is condensed and changed into heat energy and the heat energy is converted into electrical power. More concretely, in the technique, sunlight is reflected by a large number of reflecting mirrors (heliostat) arranged a tower and is condensed into a heat exchanging unit by a condensing mirror mounted on the tower so as to heat the heat exchanging unit, and then the heat energy obtained by the heat exchanging unit is sent to an electric power generating unit, whereby electric power is generated.

Patent document 1: Japanese Patent Unexamined Publication No. 11-119105

DISCLOSURE OF THE INVENTION

Problem to be Solved by the Invention

Incidentally, in order to convert sunlight into energy efficiently, there is a problem that how to produce a reflecting mirror. Generally, in order to acquire the characteristic to reflect light in an optical element, a metal vapor-deposited film and a dielectric multilayer are formed as a reflective film on a light entering surface or a surface opposite to the light entering surface in many cases. In the case that a sunlight collecting system is structured by the utilization of a reflective mirror employing such a reflective film, the following problems may occur.

For example, since a primary reflective mirror to reflect sunlight first is arranged in outdoors such that its reflective surface is made to face upward in the gravity direction, there is high risk that rain, snow, hail, dust, etc. may fall onto the reflective surface. Further, since these fallen matters are accumulated, it is necessary to clean the upper surface periodically. Therefore, when a reflective film is formed on the surface of a base plate, there is fear that a reflective film may be peeled off, broken, etc. at an early stage due to physical damage caused by a falling object or cleaning.

On the other hand, since sunlight with an extremely high light amount concentrates on a secondary reflective mirror to collect and reflect primarily reflected light, if a base plate absorbs even a part of the sunlight, the reflective mirror becomes a high temperature. As a result, and there is fear that a deformation, a fused damage, etc. may occur on it depending on the case.

The present invention has been achieved in view of these problems, and an object of the present invention is to provide a sunlight collecting system excellent in reliability.

Means for Solving the Problems

In a sunlight collecting system to collect light by reflecting sunlight and to generate energy, the sunlight collecting system of the present invention is characterized in that the sunlight collecting system comprises a first optical element for a primary reflection to reflect sunlight primarily and a second optical element for a secondary reflection to reflect the primarily reflected light, wherein the first optical element has a reflective film formed on a surface of a base plate opposite to a sunlight entering surface, and the second optical element has a reflective film formed on a sunlight entering surface of a base plate.

Effect of Invention

According to the present invention, in the first optical element, since a reflective film is formed on a surface of a base plate opposite to a sunlight entering surface, even if falling objects collide and adhere to the entering surface or the fallen objects accumulated on the entering surface are cleaned periodically, the reflective surface is protected by the base plate. Therefore, the peeling-off or breakage of the reflective surface can be suppressed. On the other hand, in the second optical element, since a reflective film is formed on a sunlight entering surface of a base plate, even if sunlight with strong energy enters, the sunlight is reflected on the reflective film before reaching the base plate. As a result, there is little fear that the base plate is heated. Moreover, when the reflective film is made to face downward in the gravity direction, it becomes possible to eliminate fear that a falling object accumulate on the reflective film. Incidentally, another reflection may be made between the primary reflection and the secondary reflection.

In the first optical element, a metal vapor-deposited film or a combination of a metal vapor-deposited film and a dielectric multilayer is desirably used as the above-mentioned reflective film, and in the case that the above combination is used as the reflective film, it is desirable that the dielectric multilayer is formed at a light incidence side than the metal vapor-deposited film.

FIG. 1 is a diagram showing an energy distribution of sunlight. A dotted line shows energy in solar insolation in outer space, and a solid line shows energy in solar insolation on the ground. The energy in solar insolation on the ground includes roughly energy contained in ultraviolet radiation in an amount of 8%, energy contained in visible light in an amount of 44%, and energy contained in infrared light in an amount of 48%. Therefore, in order to utilize the energy of sunlight efficiently, it is necessary to increase reflective characteristics to cover a wide band including up to a range of infrared light.

Here, in a common reflective minor, an Ag vapor-deposited film is used in many cases. As shown in FIG. 2, since the Ag vapor-deposited film has a reflectance ratio of 90% or more in a wide band of a wavelength of 0.4 μm or more, it can be said that the Ag vapor-deposited film is suitable to reflect sunlight. However, Ag has a problem that it tends to easily oxidize. Therefore, if a reflective mirror provided with a Ag vapor-deposited film is installed in outdoors for reflecting sunlight, there is a possibility that reflective characteristics may deteriorate for a short period of time. On the other hand, as compared with Ag, Al (aluminum) has a characteristic that it hardly oxidizes. However, as shown in FIG. 2, a reflectance ratio becomes low in a band of a wavelength of 0.6 μm to 1.0 μm.

On the other hand, in precision optical devices etc., a technique to reflect light with a dielectric multilayer is known. By the use of such a dielectric multilayer, it becomes possible to obtain a high reflectance ratio even in a wide band. However, in order to correspond to the wide band, it may be necessary to increase the number of layers. As a result, the thickness of a film tends to become ticker. However, in the case of reflecting light with such a dielectric multilayer with a large thickness, if light enters its reflective surface from a direction vertical to the reflective surface, there is no problem. However, as an incidence angle of light to the reflective surface become smaller, the optical path length of light passing through the dielectric multilayer becomes longer. As a result, there is problem that it becomes difficult to obtain an expected reflective characteristic. This means that when sunlight enters with a shallow incidence angle in morning or evening, the utilization efficiency of light decreases.

With reference to FIG. 2, for example, an Al vapor-deposited film has characteristics that although a reflectance ratio in a band of a wavelength of 0.6 μm to 1.0 μm is relatively low, a reflectance ratio in a band except the above band is 90% or more. On the other hand, a dielectric multilayer has a feature that generally, the number of layers can be refrained to few, if a band to be reflected is restricted to narrow. Then, in the present invention, a region where the reflectance ratio of a metal vapor-deposited film is low is compensated with the reflection of a dielectric multilayer so that a high reflectance ratio can be obtained over a wide band as a whole. With this way, it becomes possible to reduce the number of layers of a dielectric multilayer and to reflect light entering with a shallow incidence angle with a high reflectance ratio.

Here, an important point is that since a dielectric multilayer is made such that a low refractive layer and a high refractive layer are laminated, the dielectric multilayer has a characteristic to allow light in a band other than a reflecting band to pass through different from a metal vapor-deposited film. Therefore, if a dielectric multilayer is formed at an incidence side than the metal vapor-deposited film, light in a band where the dielectric multilayer has a high reflectance ratio is reflected by the dielectric multilayer with the high reflectance ratio. On the other hand, light in a band where the dielectric multilayer has a low reflectance ratio passes through the dielectric multilayer, and thereafter, is reflected by the metal vapor-deposited film with a high reflectance ratio. Therefore, even if a metal vapor-deposited film and a dielectric multilayer are laminated, these films are refrained from restricting reflection with each other, whereby it can be possible to realize reflection with high efficiency by the total.

There is no restriction in a kind of metals to be vapor-deposited. However, it is desirable to use aluminum from viewpoints of cost, resistance to weather, etc. The dielectric multilayer is made such that a high refractive index layer and a low refractive index layer are laminated. For example, it is disclosed in Japanese Unexamined Patent Publication No. 2005-292462. The base plate is desirably glass or plastic.

It is desirable that the second optical element has at least a dielectric multilayer as the reflective film, and the dielectric multilayer has at least one or more bands where a reflectance ratio becomes 50% or less in a range of 0.8 μm to 2.4 μm in wavelength of incident light.

In the band where the reflectance ratio of a reflective film is low, a part of sunlight is absorbed by the reflective film or the base plate and converted into heat, whereby the reflective mirror is heated. In such a case, in a reflective mirror to reflect sunlight primarily, since heating amount is slight, a big problem is not raised specifically. However, in a reflective mirrors used for a secondary reflection to collect and reflect primarily reflected light, since an extremely high light amount of sunlight concentrates, even if a part of the sunlight is converted into heat, there is fear that fused damage is caused on the reflective mirror.

In contrast, according to the present invention, in the second optical element, since a dielectric multilayer with a high reflectance ratio in a range corresponding to visible light region having large energy is formed on a light entering surface side of a base plate, a visible light component of entering sunlight is reflected on the dielectric multilayer without reaching the base plate. Therefore, even in the case that the base plate is made of a material (ceramic, etc.) absorbing sunlight, there is no fear that the base plate is heated. However, as mentioned above, in order to make a dielectric multilayer correspond to a wide band, it is supposed that the number of layers must be increased. Therefore, with the increased number of layers, the thickness tends to become thicker, and there may be a case that the expected reflection characteristics cannot be obtained.

However, a dielectric multilayer is not required to reflect all the components of infrared light among sunlight. More specifically, as shown in FIG. 1, with regard to solar insolation energy on the ground in a range of infrared light, that is, in a range of a wavelength of 0.8 μm to 2.4 μm, there is a band (for example, wavelength of around 1.4 μm, 1.9 μm) where energy becomes low. Since the sunlight in such a band has not energy, a dielectric multilayer is not required to have a characteristic to reflect the sunlight in such a band. Accordingly, the number of layers of the dielectric multilayer can be reduced by the layers corresponding to the not-required characteristic. Moreover, if a metal vapor-deposited film is provided between a dielectric multilayer and a base plate, since a metal vapor-deposited film has a high reflectance ratio in a band of an infrared light, the sunlight having passed through the dielectric multilayer is reflected on the metal vapor-deposited film. As a result, there is no fear that a base material is heated. Namely, if the dielectric multilayer of the present invention has at least one or more of bands where a reflectance ratio becomes 50% or less (preferably, 20% or less, more preferably 10% or less) in a range of 0.8 μm to 2.4 μm in wavelength of incidence light, the number of layers of a dielectric multilayer can be reduced while securing the reliability of the optical element, whereby the cost can be reduced.

Further, if the second optical element is used for a secondary reflection to reflect the primarily reflected light of sunlight, since the second optical element emits light to a fixed heat convening device, the angle of incidence light also becomes almost constant. Therefore, since the incidence angle of sunlight entering a dielectric multilayer is almost constant, even if the number of layers is increased in order to secure the reflection characteristics for a wide band, there are advantages that the high utilization efficiency of light can be maintained regardless of the position of the sun.

If the base plate of the first optical element is plastic or glass, it can be manufactured easily, on the other hand, if the base plate of the second optical element is it is desirable that it is excellent in heat resistance.

EXPLANATION OF REFERENCE SYMBOLS

1 Elliptic Mirror
2 Supporting Tower
3 Heat Exchange Facility
4 Condensing Mirror
5 Heliostat
6 Supporting Pole
7 Fork
8 Ring-shaped Rail
9 Rotating Pulley
10 Pressing Pulley
11 Motor
12 Timing Belt
13 Concave Mirror
14 Circular Pipe
15 Rotating Shaft
16 Circular Rail
17 Rotating Pulley
18 Pressing Pulley
19 Power Pulley
20 Motor
21 Timing Belt
22 Arm
23 Sensor
31 Lower Opening
L Sunlight
OE First Optical. Element
OE1, OE2, OE3, OE4 Second Optical Element
SS Base Plate

BEST MODE FOR CARRYING OUT THE INVENTION

Figure 1:
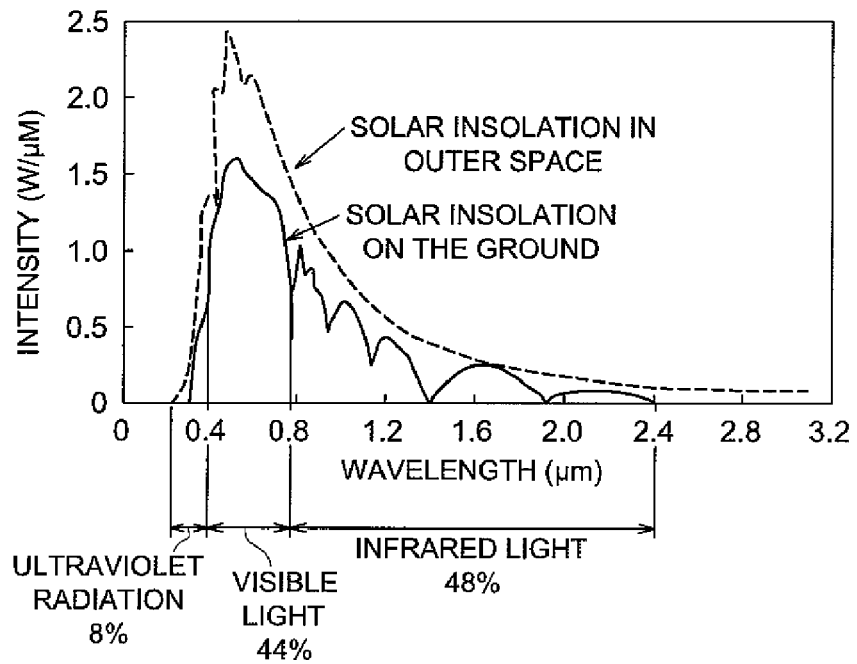
FIG. 1 is a diagram showing an energy distribution of sunlight.
Figure 2:
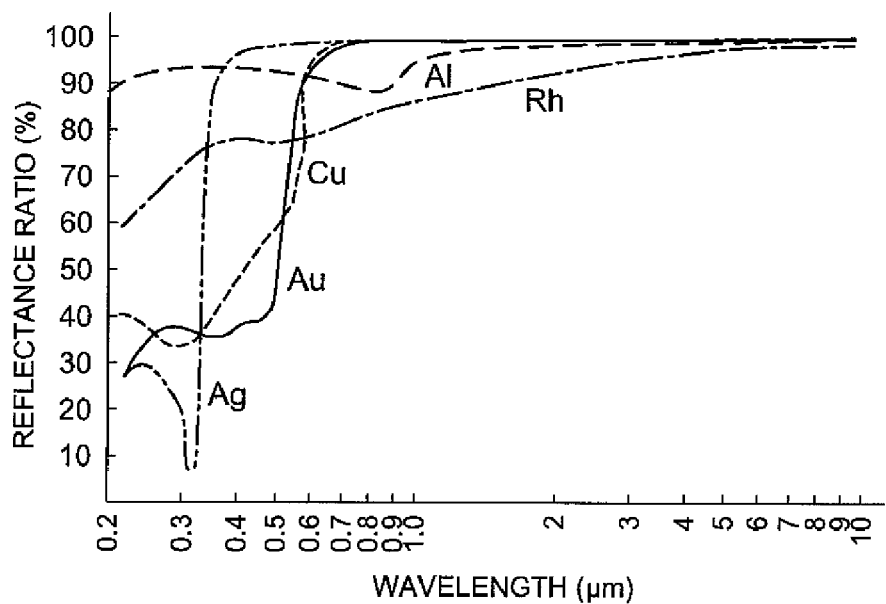
FIG. 2 is a graph showing a reflectance ratio of metals for wavelength of light.
Figure 3:
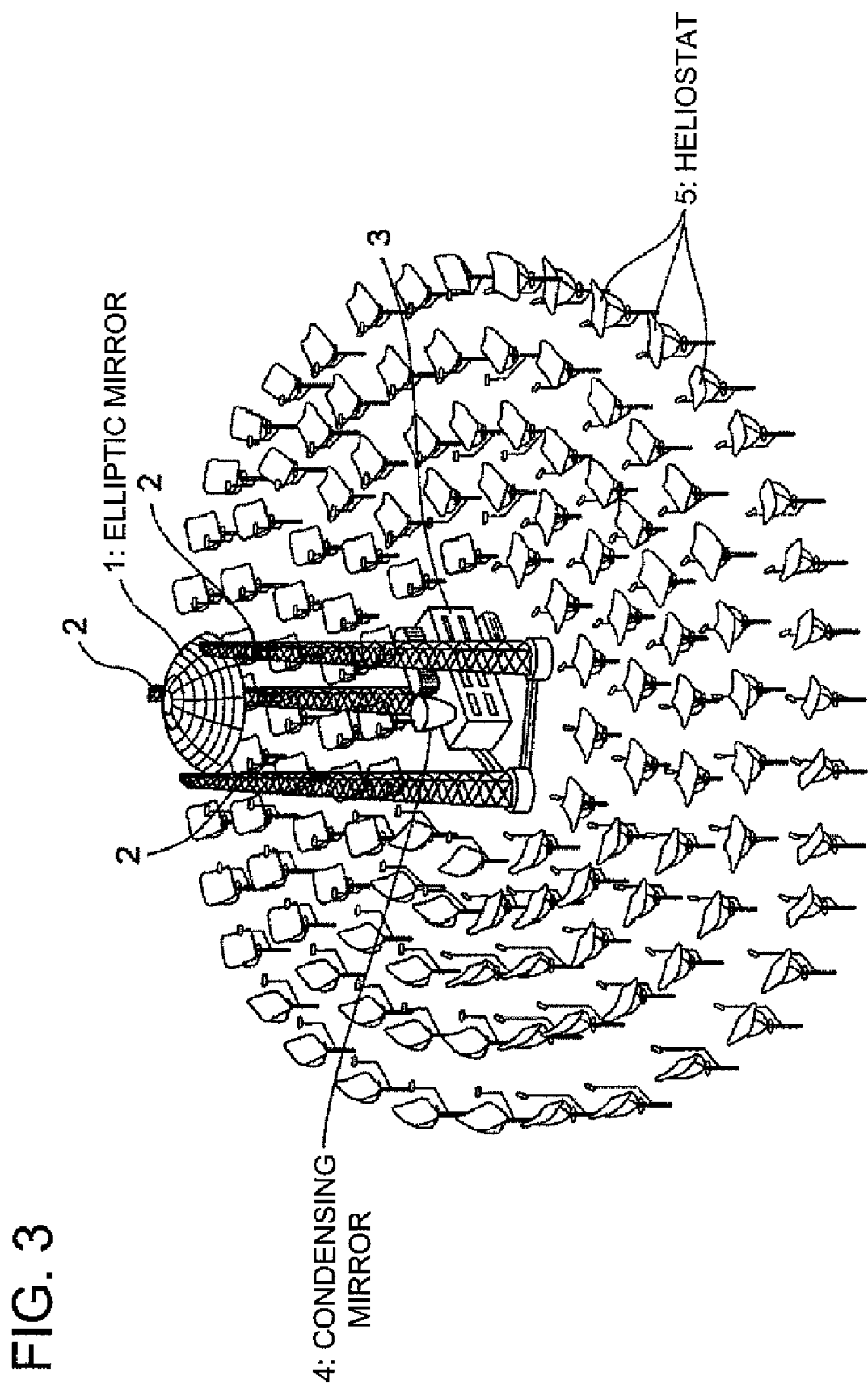
FIG. 3 is a perspective view of a sunlight condensing system employing an optical element according to the present invention.
Figure 4:
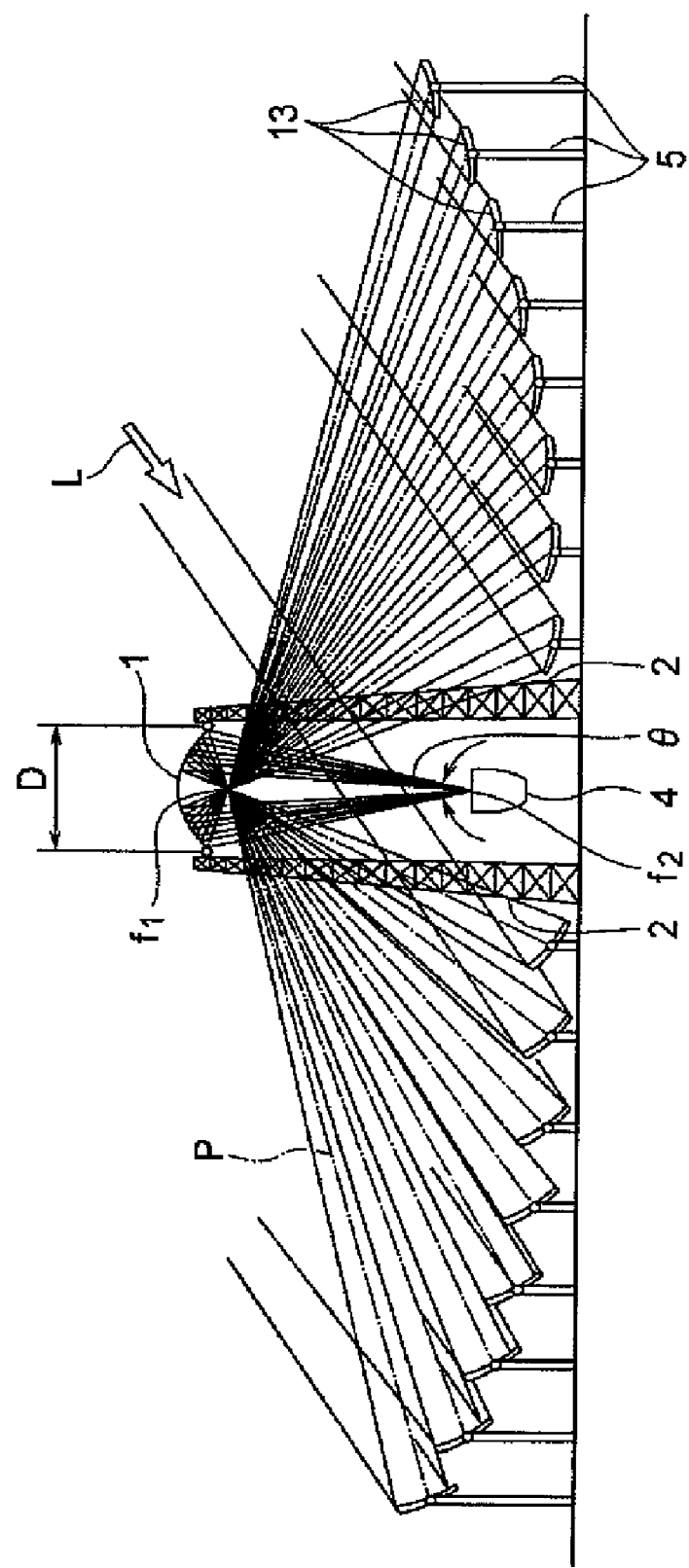
FIG. 4 is a view looking the sunlight condensing system according to the present invention from its side.

Hereafter, with reference to drawings, an embodiment of the present invention will be described more in detail. FIG. 3 is a perspective view of the sunlight condensing system according to the present invention. FIG. 4 is a drawing viewing this sunlight condensing system from its side. In FIGS. 3 and 4, an elliptic mirror 1 being a second optical element and having a relatively large diameter is supported by three supporting towers 2 at a position with a predetermined height on the condition that its reflective surface faces downward.

Under the elliptic mirror 1, built is a heat exchange facility 3 which accommodates a heat exchanging unit to convert sunlight L into heat energy, and on the upper part of this heat-exchange facility 3, a condensing mirror 4 is installed. Further, on the ground around the heat exchange facility 3, a number of heliostats 5 are arranged on the condition that the heliostats 5 surround the elliptic mirror 1.

Figure 5:
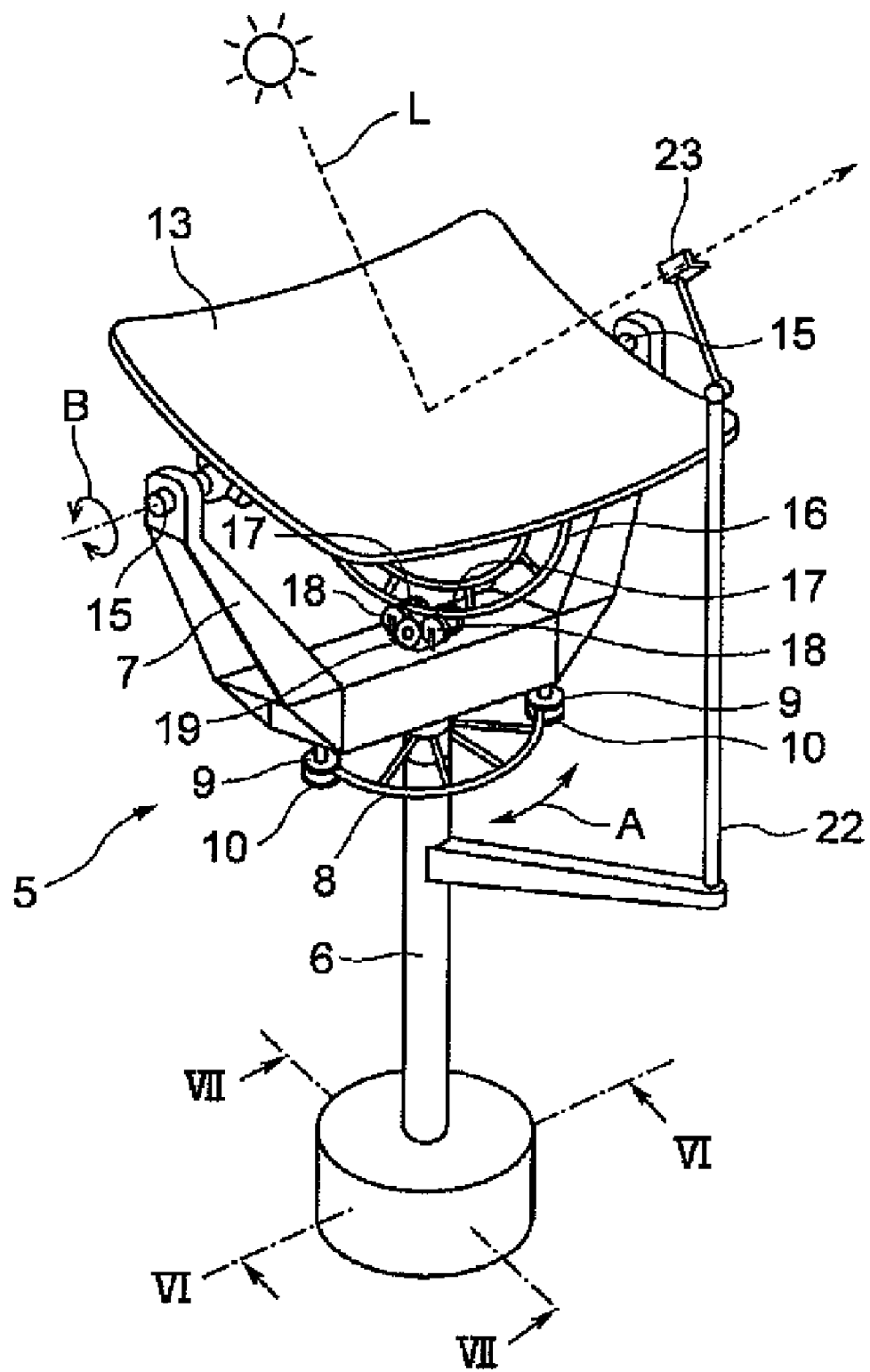
FIG. 5 is a perspective view of a heliostat 5.
Figure 6:
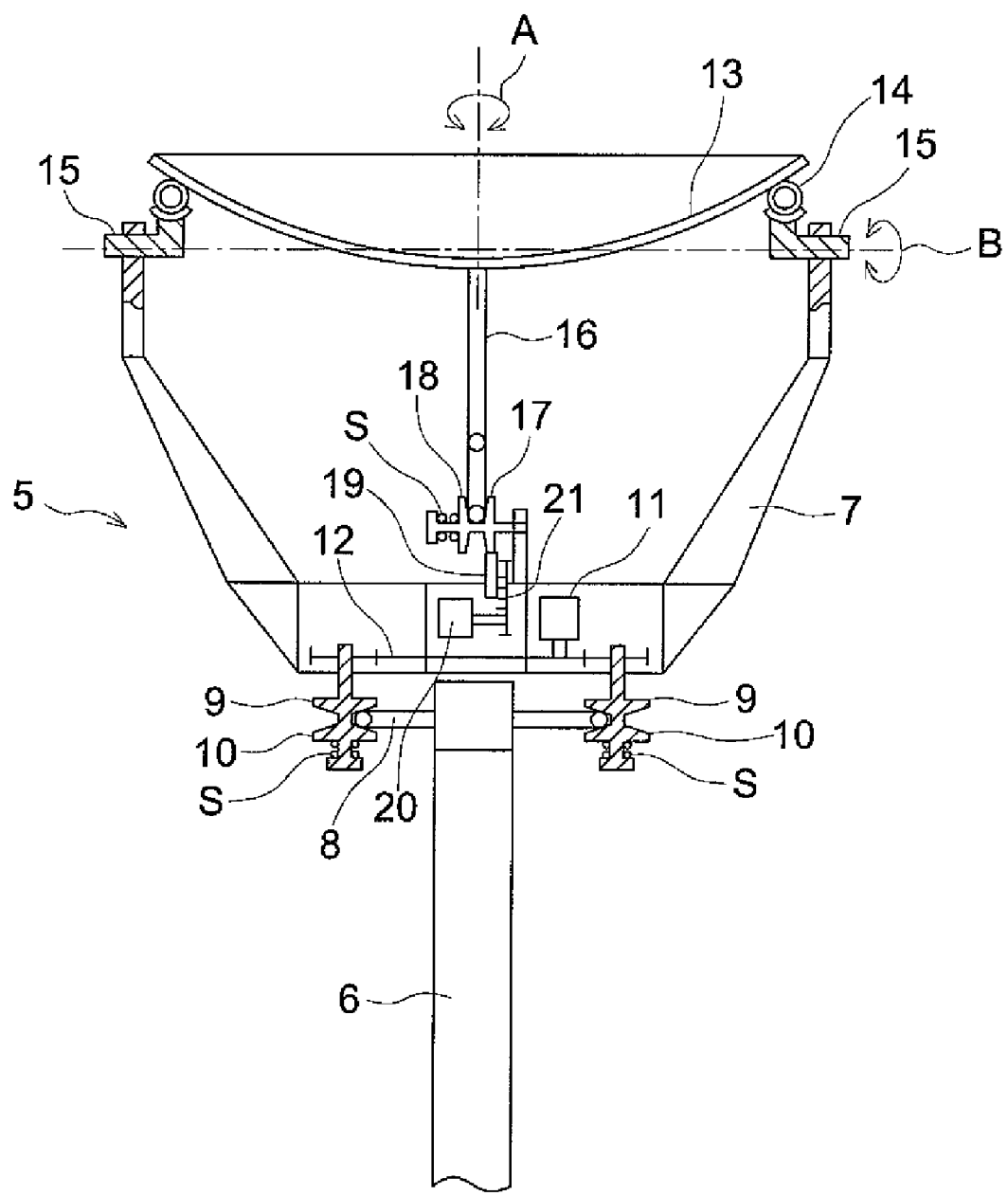
FIG. 6 is a view of the structure of FIG. 5 which is cut at a plane including a VI-VI line and looked to the arrowed mark direction.
Figure 7:
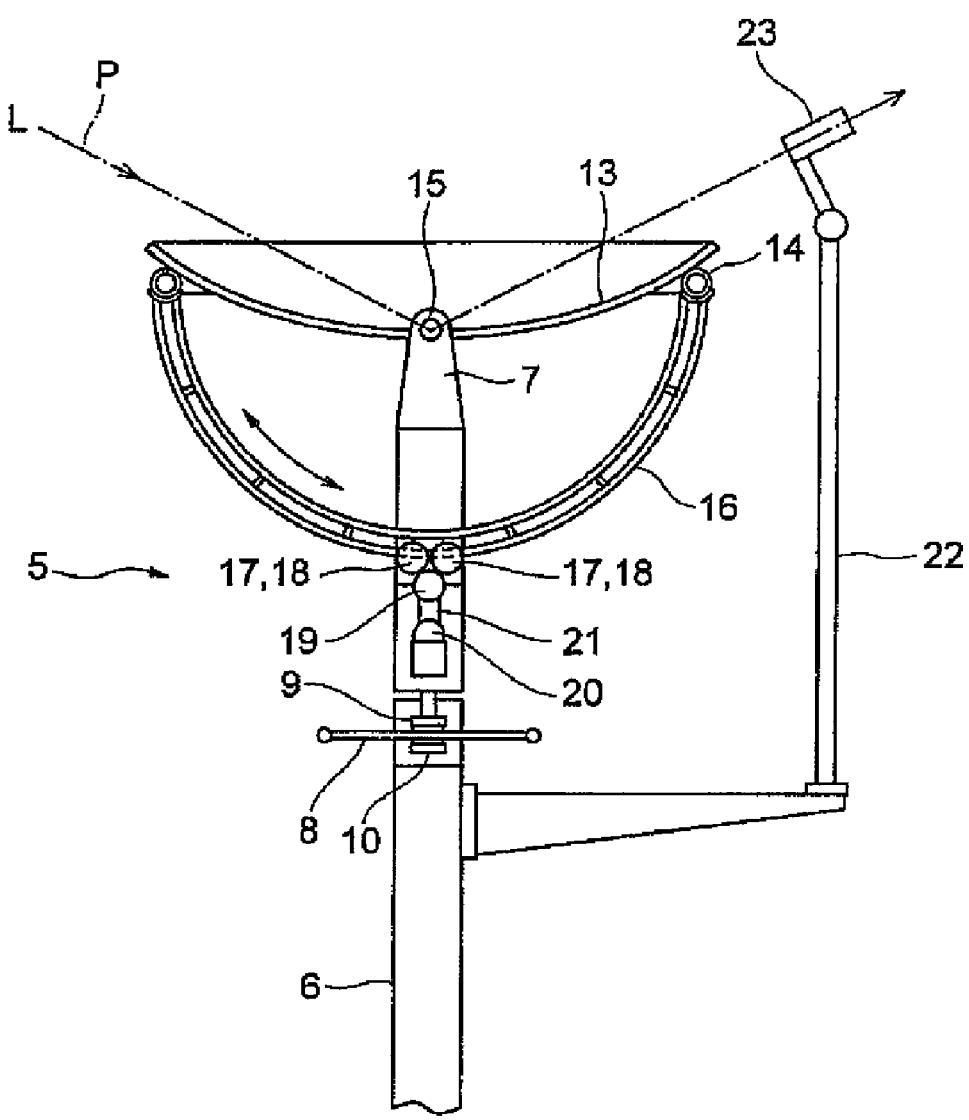
FIG. 7 is a view of the structure of FIG. 5 which is cut at a plane including a VII-VII line and looked to the arrowed mark direction.

FIG. 5 is a perspective view of a heliostat 5. FIG. 6 is a view of the structure of FIG. 5 which is cut at a plane including a VI-VI line and looked to the arrowed mark direction. FIG. 7 is a view of the structure of FIG. 5 which is cut at a plane including a VII-VII line and looked to the arrowed mark direction. In FIG. 5, a supporting pole 6 of the heliostat 5 is installed on the ground and is extended vertically, and, to the upper part of the supporting pole 6, a fork 7 is attached such that the fork 7 can rotate and shift freely in the direction of an azimuth angle (A direction) in connection with the supporting pole 6. Further, around the upper end of the supporting pole 6, a ring-shaped rail 8 is provided. Furthermore, the underside of fork 7, rotating pulleys 9 are rotatably mounted at opposite positions across the supporting pole 6, respectively, and pressing pulleys 10 are provided adjacently to the rotating pulleys 9 and are urged toward the rotating pulleys 9 with aid of springs S (S in FIG. 6). Between the rotating pulleys 9 and the pressing pulleys 10, a ring-shaped rail 8 is pinched and held. A timing belt 12 is stretched and wound around the pair of rotating pulleys 9 so that the pair of rotating pulleys 9 rotates synchronously. Accordingly, when a motor 11 is driven, the rotating pulleys 9 rotate via the timing belt 12, whereby the fork 7 rotates in the direction of an azimuth angle along the ring-shaped rail 8. At this time, since the ring-shaped rail 8 is pressed with the pressing pulleys 10, the fork 7 can perform a stable rotation.

On the upper end of the fork 7, a concave mirror 13 being a first optical element is held so as to rotate and shift freely in the direction of an elevation angle (B direction). The concave mirror 13 is shaped in the form of a rectangular plate and has a reflective surface being a curved surface (including an aspheric surface, a paraboloidal surface, etc.). However, this reflective surface may be a flat surface.

Circular pipes 14 are fixed to the reverse side of the concave minor 13. As shown in FIG. 6, at the central point of each of opposite sides of the concave mirror 13, rotation shafts 15 are fixed to the circular pipes 14 respectively so as to align along an axis. The pair of rotation shafts 15 extending in the horizontal direction is supported on the upper end of the fork 7. Therefore, the concave minor 13 is adapted to be rotatable around the axis of the rotation shafts 15 in the direction of elevation angle.

On the other hand, as shown in FIG. 7, at the central point of each of two sides different from the two sides on which the rotation shafts 15 are provided, the both ends of the circular rail 16 are fixed. On the bottom plane at the central section of the fork 7, two sets of a rotating pulley 17 and a pressing pulley 18 being urged with a spring (not shown in the drawing) are provided, and the circular rail 16 is pinched and supported by each of the rotating pulley 17 and the pressing pulley 18. Further, to the fork 7, a power pulley 19 is provided so as to engage with both of the rotating pulleys 17, and around the power pulley 19, stretched and wound is a timing belt 21 to which power is transmitted from a motor 20. With the above configuration, when the motor 20 is driven, the power pulley 19 and the rotating pulley 17 are rotated through the timing belt 21, whereby the circular rail 16 is shifted relatively, and the concave mirror 13 can rotate around the rotation shafts 15 and shift in the direction of elevation angle. Herein, in order to make the adjustment of the heliostat 5 easy, a red seal (coloring section) and the like may be pasted on a part of the concave mirror 13 such that it makes possible to confirm visually the direction in which light proceeds. After the adjustment, the red seal may be removed.

The height of the concave mirror 13 of the heliostat 5 becomes gradually high as the position of the concave mirror 13 separates from the elliptic mirror 1 at the central section. This is because a concave mirror 13 is made so as to prevent it from becoming a shadow for another concave mirror 13 at the time of reflecting sunlight, whereby a shading loss can be prevented from taking place.

Figure 8:
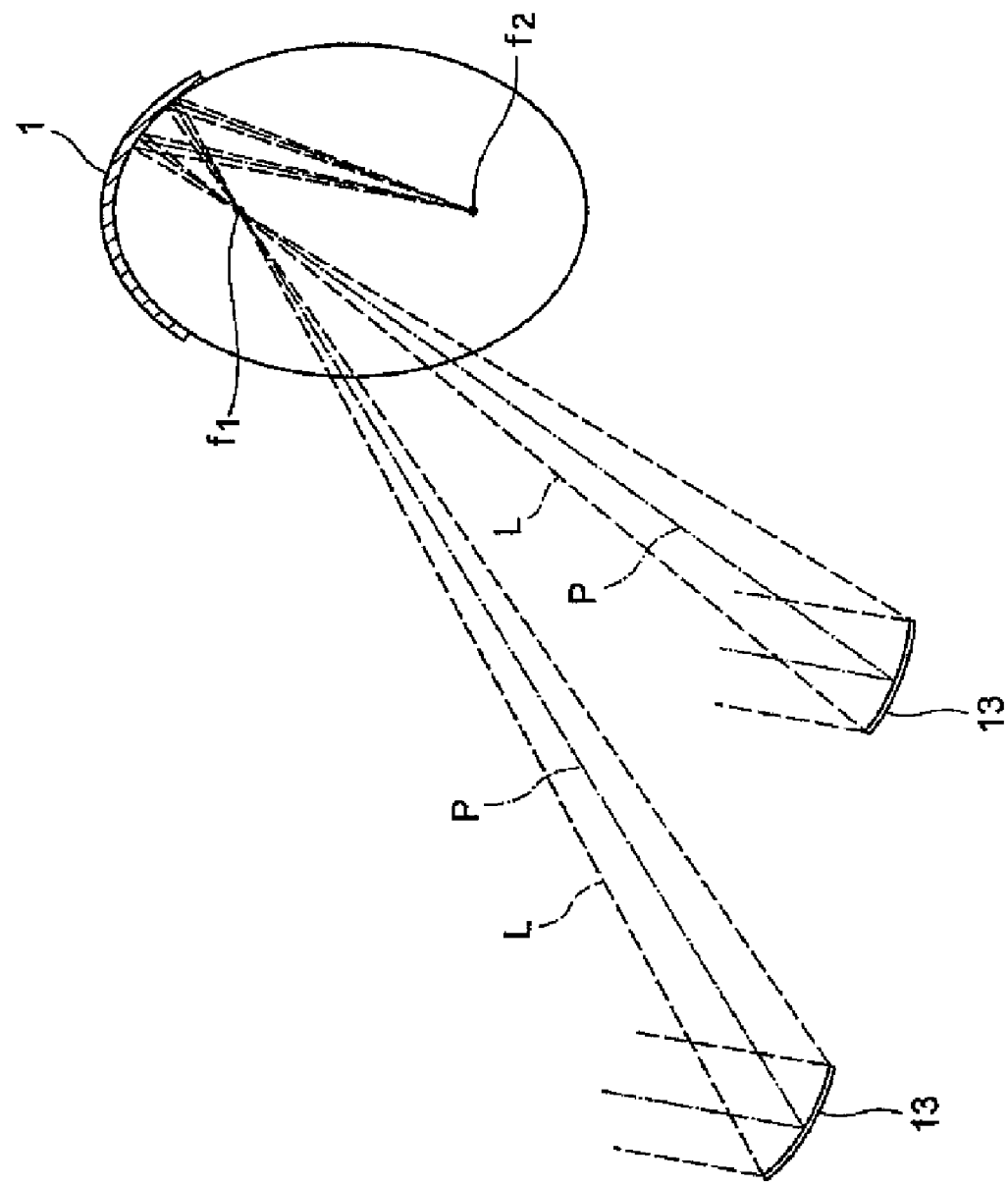
FIG. 8 is a diagram showing a relationship in terms of the position of focal point between an elliptic minor and a concave minor.

Moreover, in FIG. 5, a sensor 23 is fixed to the supporting pole 6 of the heliostat 5 through an arm 22 attached the supporting pole 6. The sensor 23 is used to detect the incidence direction of sunlight L. That is, motors 11 and 20 are controlled by signals outputted from the sensor 23, so that the sunlight L reflected on the concave mirror 13 always proceeds to the first focal point f1 (refer to FIG. 8) of the elliptic mirror 1. With this, even if the incidence direction of sunlight L changes in accordance with the passage of time, it is made possible to reflect the sunlight L from the concave mirror 13 toward the first focal point f1 of the elliptic mirror 1 surely. Sunlight reflected from each concave mirror 13 toward the elliptic mirror 1 is further reflected on the elliptic mirror 1 and proceeds to a condensing mirror 4.

Figure 9:
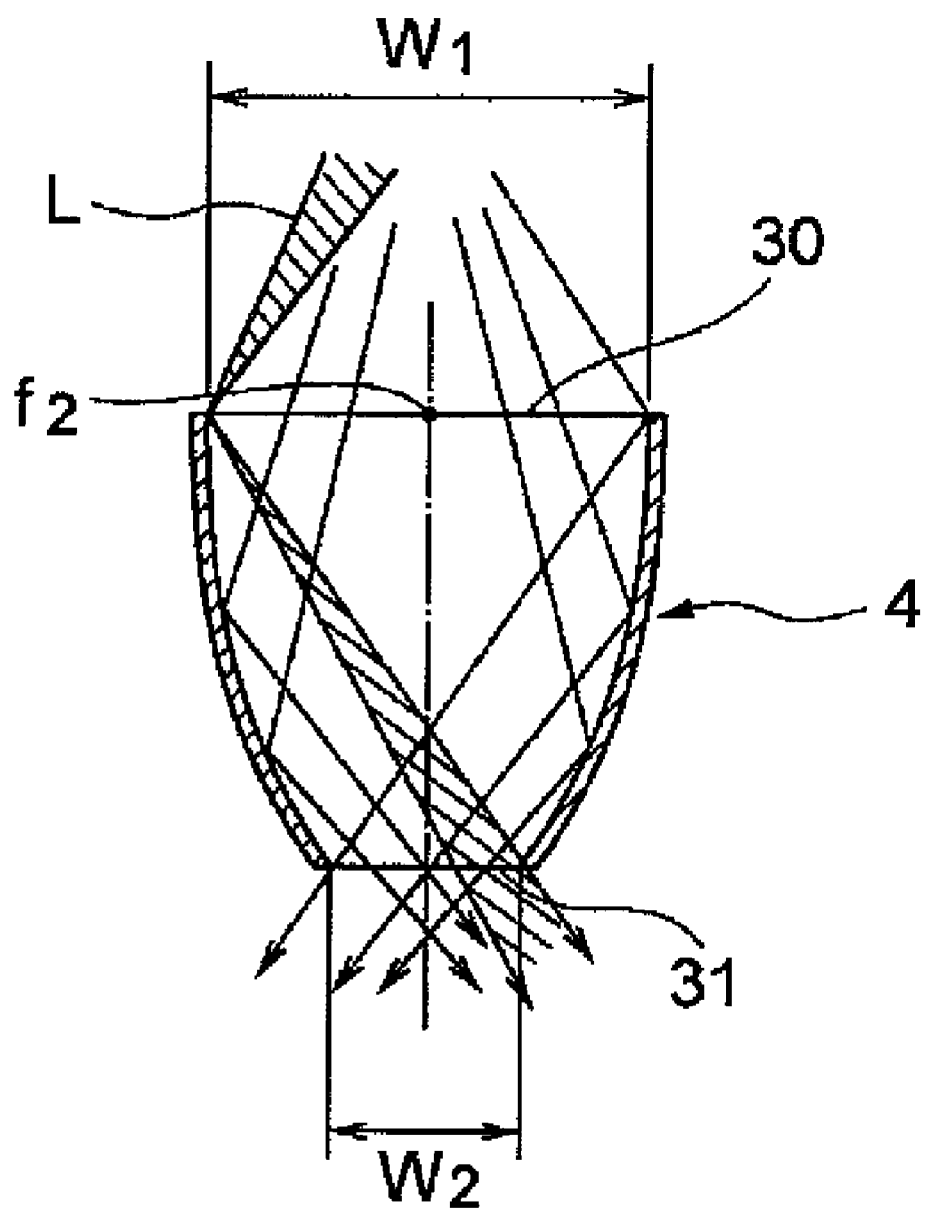
FIG. 9 is a cross sectional view of a condensing mirror.

With regard to reflection on the inside of this condensing mirror 4, it may be preferable in consideration of loss of light that, as shown in FIG. 9, the light having entered from an upper opening 30 exits from a lower opening 31 having a narrowed diameter by being reflected only one time on the inside. However, it may be free to make the lower opening 31 with the small diameter such that the light is reflected two times or more on the inside. The sunlight L which has exited from the lower opening 31 is sent into the heat exchange facility 3, and is converted into heat energy by a predetermined heat exchanging unit, whereby electric power can be generated by the utilization of the heat energy.

Figure 10:
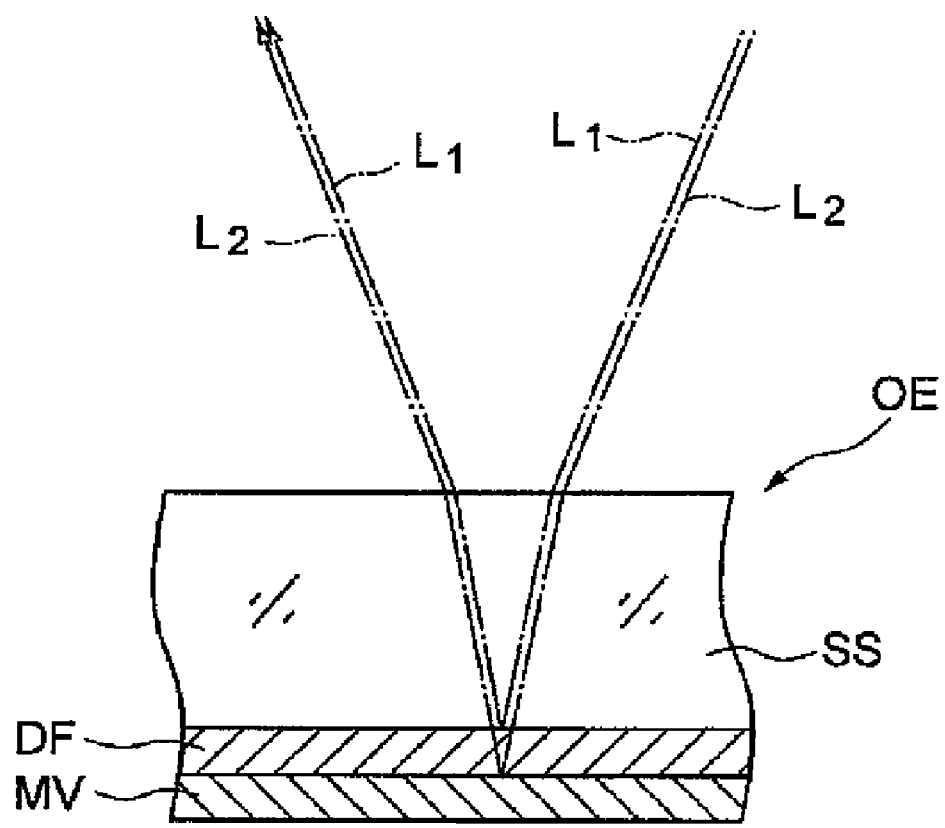
FIG. 10 is a cross sectional view of a reflective surface of a first optical element OE capable of being used as a concave mirror 13.

FIG. 10 shows a cross sectional view of a reflective surface of a first optical element OE capable of being employed as the concave mirror 13. For the purpose of making it easy to understand, the film thickness is illustrated to be thicker than the actual size in comparison with the thickness of a base plate. As a reflective film, on a surface of a parallel plate-shaped transparent glass or plastic base plate SS which is opposite to a sunlight entering surface, a dielectric multilayer DF and a metal vapor-deposited layer MV are formed in this order from the light entering side. Here, the dielectric multilayer DF has a high reflectance ratio for light only in a short wavelength band. Further, the reflective film may be formed only with a metal vapor-deposited layer. In this case, the vapor-deposited metal is preferably Al. When sunlight enters the optical element OE, among the sunlight, light L1 in the short wavelength band passes through the base plate SS, then is reflected on the dielectric multilayer DF, further passes through the base plate SS, and is emitted out. On the other hand, light L2 in a long wavelength band other than the light L1 passes through the base plate SS and the dielectric multilayer DF, then, is reflected on the metal vapor-deposited layer MV, further passes through again the dielectric multilayer DF and the base plate SS, and is emitted out. With this, since it is possible to secure a high reflectance in a wide band, and also to protect the reflective film with the base plate SS, it is preferable for the concave mirror 13.

Figure 11:
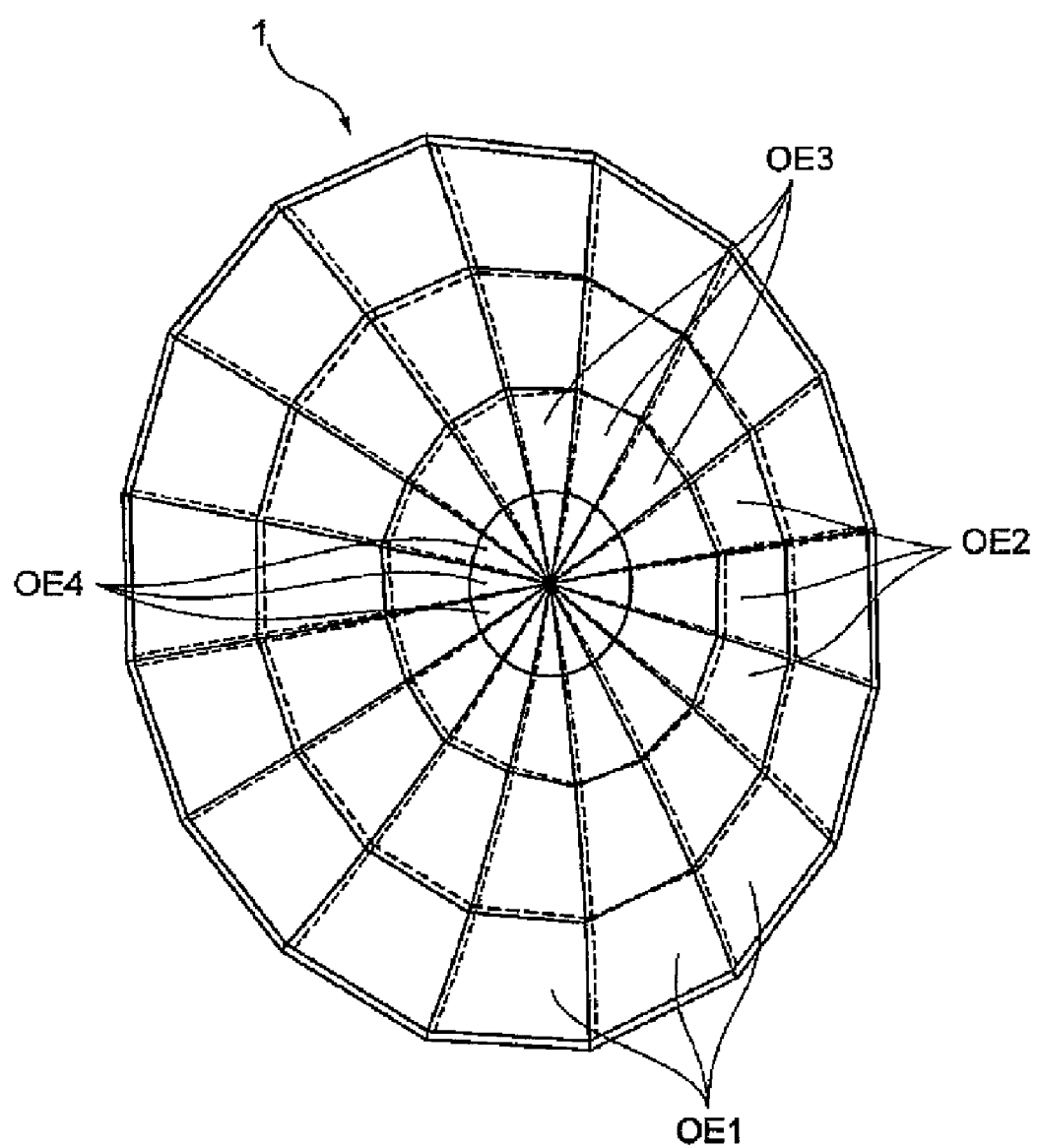
FIG. 11 is an outline perspective view of an elliptic mirror 1.

FIG. 11 is an outline perspective view of an elliptic mirror 1. The elliptic mirror 1 has the configuration that a plurality of plate-shaped second optical elements OE1, OE2, OE3, OE4 having a concave or flat reflective surface are arranged in point symmetry along a curved surface.

Figure 12:
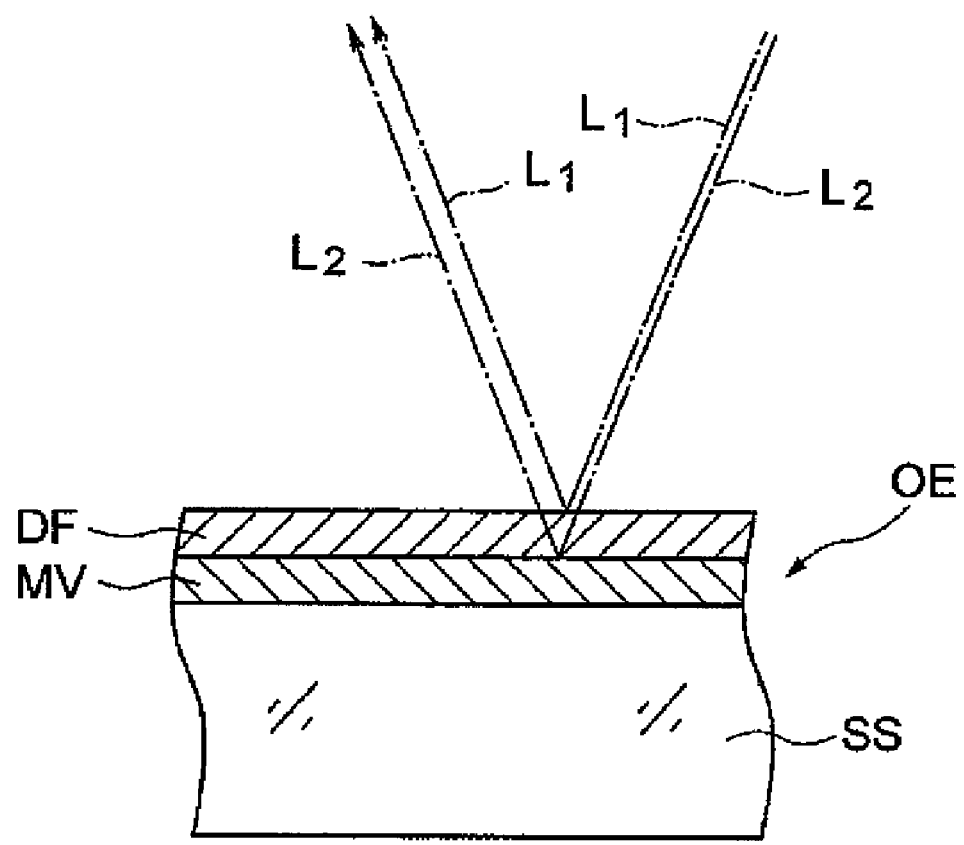
FIG. 12 is a cross sectional view of a reflective surface of a second optical element OE capable of being used as an elliptic mirror 1.

FIG. 12 shows a cross sectional view of a reflective surface of a second optical element OE1 capable of being employed as the elliptic mirror 1. The other second optical elements OE2, OE3, OE4 are same as the second optical element OE1. For the purpose of making it easy to understand, the film thickness is illustrated to be thicker than the actual size in comparison with the thickness of a base plate. As a reflective film, on a sunlight entering surface of a parallel plate-shaped ceramic or plastic base plate SS, a dielectric multilayer DF and a metal vapor-deposited layer MV are formed in this order from the light entering side. Here, the dielectric multilayer DF has a high reflectance ratio for light only in a short wavelength band. Therefore, when sunlight enters the optical element OE, among the sunlight, light L1 in the short wavelength band is reflected on the dielectric multilayer DF. On the other hand, light L2 in a long wavelength band other than the light L1 passes through the dielectric multilayer DF, then, is reflected on the metal vapor-deposited layer MV, further passes through again the dielectric multilayer DF, and is emitted out. With this, since it is possible to secure a high reflectance in a wide band, and also to suppress sunlight from reaching the base plate SS so as to refrain the second optical element OE1 from being heated, it is preferable for the elliptic mirror 1.

Figure 13:
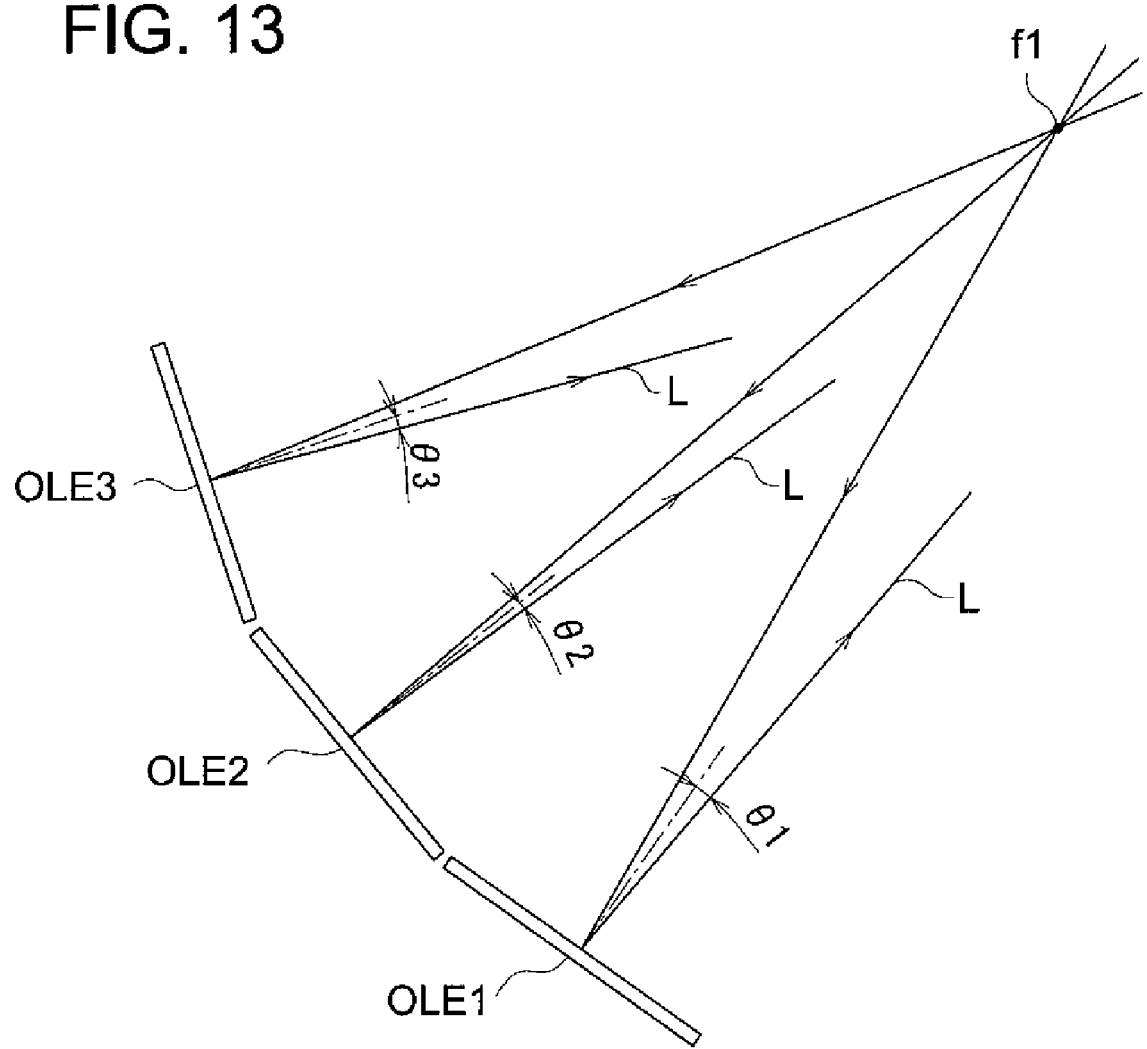
FIG. 13 is a partial cross sectional view of an elliptic mirror 1.

FIG. 13 is a partial cross sectional view of an elliptic mirror 1. On the light incidence side surface of the second optical elements OE1, OE2, OE3, a dielectric multilayer indicated in Example mentioned later on is formed. The center of light entering the second optical elements always passes through the first focal point f1. Therefore, it is assumed that the incidence angle of each of sunlight beams L entering the second optical elements OE1, OE2, OE3 is set to θ1, θ2, and θ3, respectively, even if the incidence direction of each of the sunlight L changes in accordance with the passage of time, the incidence angles θ1, θ2, and θ3 hardly change. Therefore, if the second optical elements OE1, OE2, OE3 are designed to correspond to these incidence angles θ1, θ2, and θ3, even if the film thickness of a dielectric multilayer is thicker, it becomes possible to make the mirror structure OS to exhibit a desired optical characteristic. Further, as shown in FIGS. 3 and 4, since the elliptic mirror 1 is installed such that its reflective surface faces downward in terms of the gravity direction, there is no fear that a dielectric multilayer is damaged with falling objects, such as snow, hail, and dust, whereby the elliptic mirror 1 can exhibit its optical characteristic stably over a long period of time.

EXAMPLE 1

The film thickness data of the dielectric multilayer used in Example suitably for a second optical element are shown in Table 1.

Figure 14:
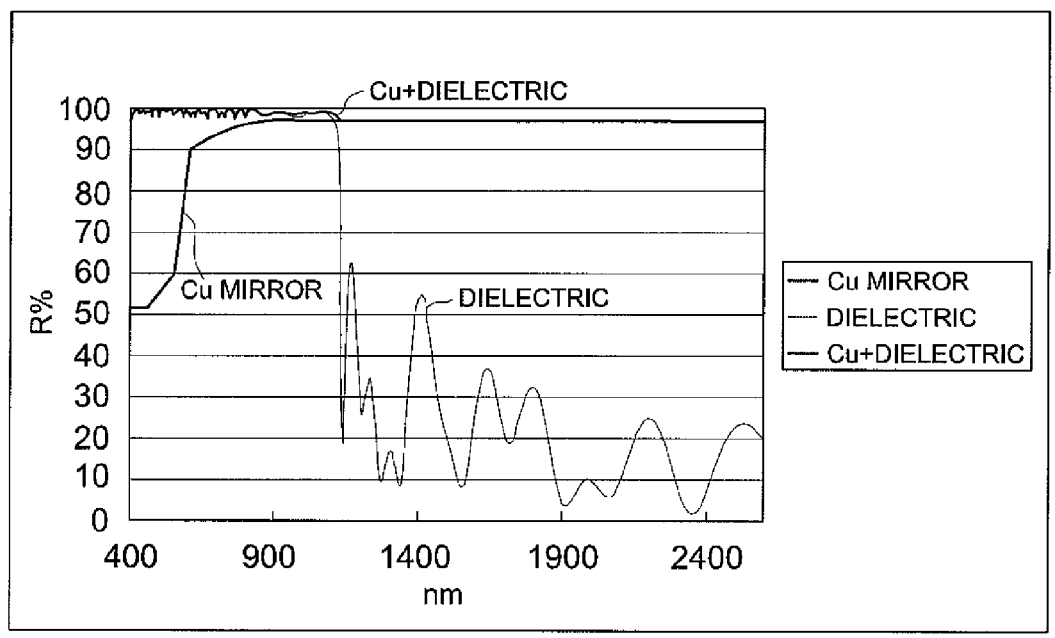
FIG. 14 is a drawing showing the reflection characteristic at the time that light was made to enter with an incidence angle of 20 degrees, in the example in which a metal vapor-deposited film made from a material of Cu and the dielectric multilayer were formed.
Figure 15:
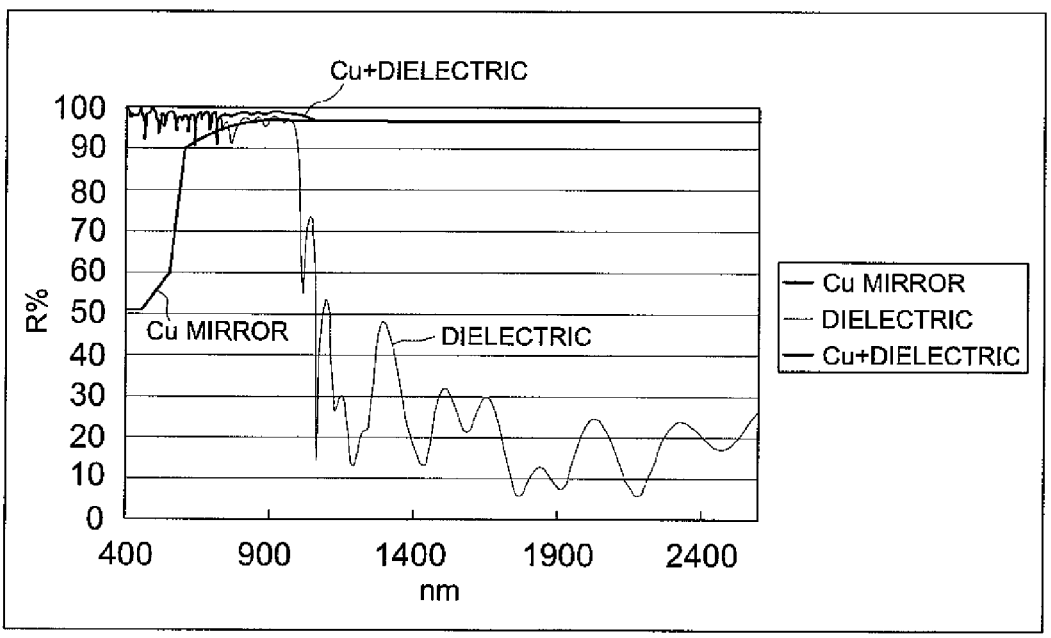
FIG. 15 is a drawing showing the reflection characteristic at the time that light was made to enter with an incidence angle of 50 degrees, in the example in which a metal vapor-deposited film made from a material of Cu and the dielectric multilayer were formed.
Figure 16:
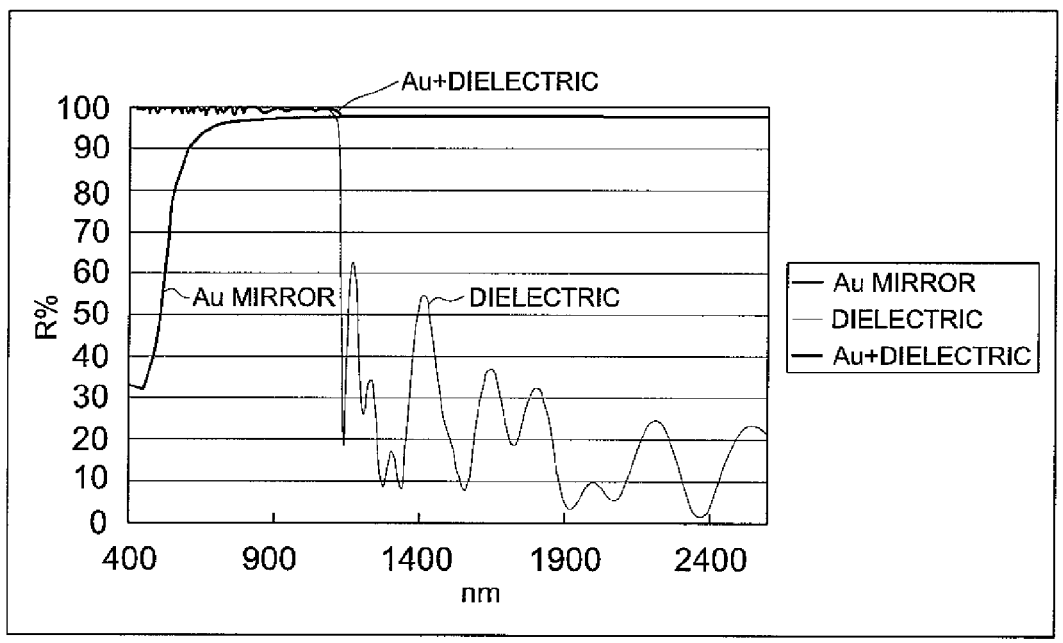
FIG. 16 is a drawing showing the reflection characteristic at the time that light was made to enter with an incidence angle of 20 degrees, in the example in which a metal vapor-deposited film made from a material of Au and the dielectric multilayer were formed.
Figure 17:
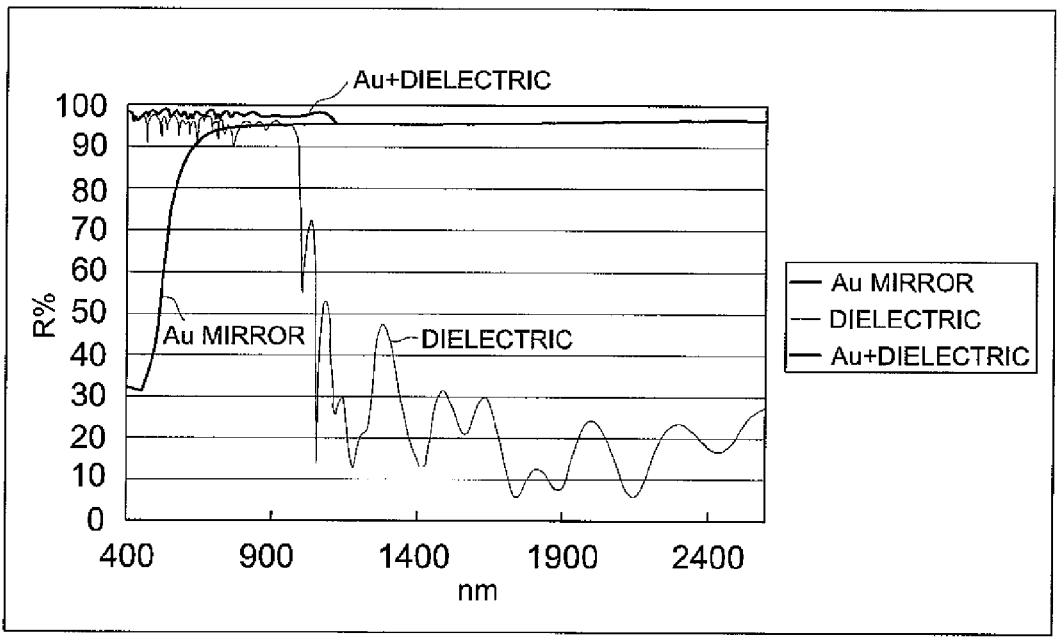
FIG. 17 is a drawing showing the reflection characteristic at the time that light was made to enter with an incidence angle of 50 degrees, in the example in which a metal vapor-deposited film made from a material of Au and the dielectric multilayer were formed.
Figure 18:
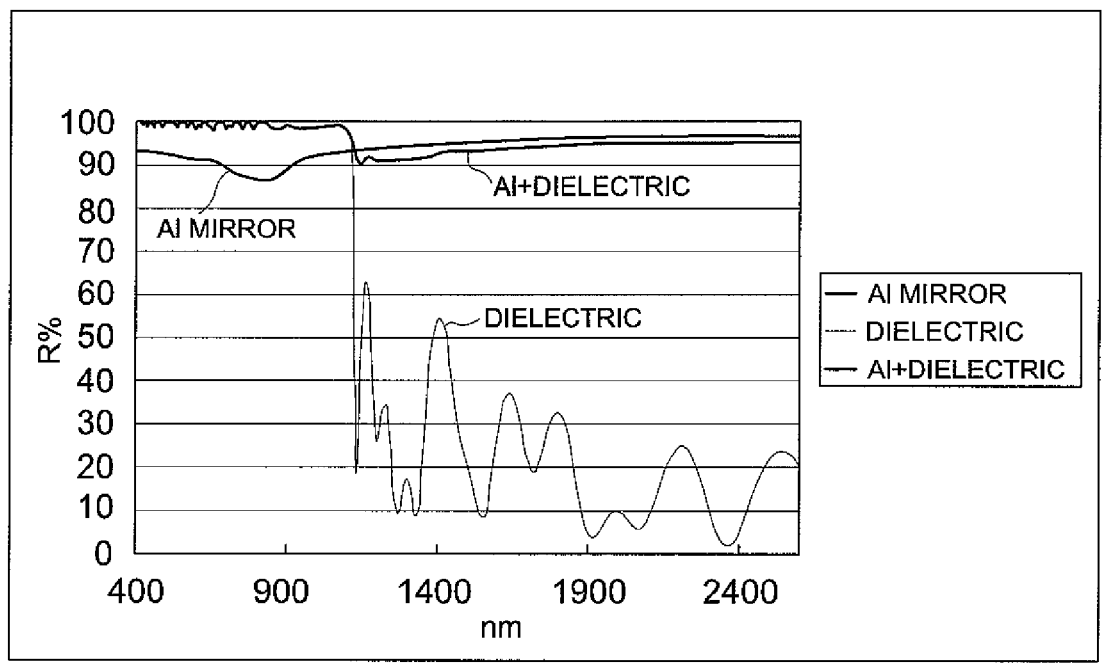
FIG. 18 is a drawing showing the reflection characteristic at the time that light was made to enter with an incidence angle of 20 degrees, in the example in which a metal vapor-deposited film made from a material of Al and the dielectric multilayer were formed.
Figure 19:
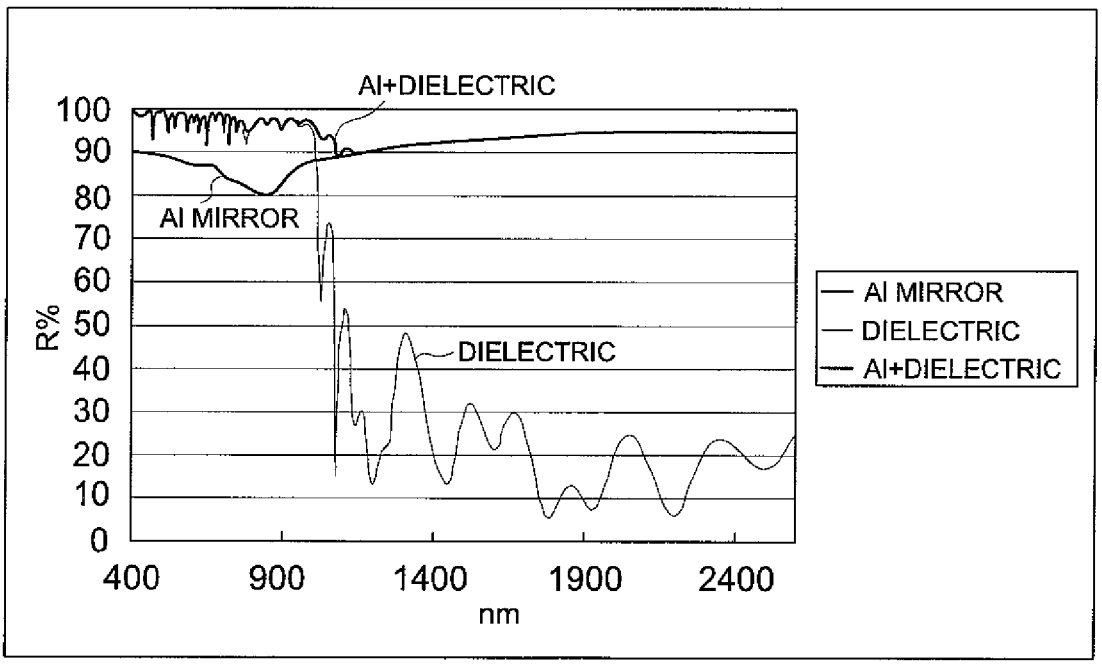
FIG. 19 is a drawing showing the reflection characteristic at the time that light was made to enter with an incidence angle of 50 degrees, in the example in which a metal vapor-deposited film made form a material of Al and the dielectric multilayer were formed.

In the example in which the dielectric multilayer shown in Table 1 was formed on a light entering surface of a glass-made base plate and a metal vapor-deposited film made from a material of Cu was formed on a surface of the base plate at the opposite side to the light entering surface, FIG. 14 is a diagram showing the reflection characteristic at the time that light was made to enter with an incidence angle of 20 degrees. In the same example, FIG. 15 is a diagram showing the reflection characteristic at the time that light was made to enter with an incidence angle of 50 degrees. In the example in which the dielectric multilayer shown in Table 1 was formed on a light entering surface of a glass-made base plate and a metal vapor-deposited film made from a material of Au was formed on a surface of the base plate at the opposite side to the light entering surface, FIG. 16 is a diagram showing the reflection characteristic at the time that light was made to enter with an incidence angle of 20 degrees. In the same example, FIG. 17 is a diagram showing the reflection characteristic at the time that light was made to enter with an incidence angle of 50 degrees. In the example in which the dielectric multilayer shown in Table 1 was formed on a light entering surface of a glass-made base plate and a metal vapor-deposited film made from a material of Al was formed on a surface of the base plate at the opposite side to the light entering surface, FIG. 18 is a diagram showing the reflection characteristic at the time that light was made to enter with an incidence angle of 20 degrees. In the same example, FIG. 19 is a diagram showing the reflection characteristic at the time that light was made to enter with an incidence angle of 50 degrees.

TABLE 1

Layer configuration in a dielectric layer

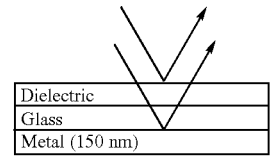

| | Glass | (nm) |
|---|---|---|
| 1 | TIO2 | 85.56 |
| 2 | SIO2 | 154.21 |
| 3 | TIO2 | 90.44 |
| 4 | SIO2 | 190.02 |
| 5 | TIO2 | 105.43 |
| 6 | SIO2 | 164.45 |
| 7 | TIO2 | 87.39 |
| 8 | SIO2 | 215.1 |
| 9 | TIO2 | 99.68 |
| 10 | SIO2 | 151.58 |
| 11 | TIO2 | 114.98 |
| 12 | SIO2 | 148.02 |
| 13 | TIO2 | 80.5 |
| 14 | SIO2 | 136.27 |
| 15 | TIO2 | 61.79 |
| 16 | SIO2 | 94.62 |
| 17 | TIO2 | 66.65 |
| 18 | SIO2 | 122.13 |
| 19 | TIO2 | 25.09 |
| 20 | SIO2 | 90.47 |
| 21 | TIO2 | 74.51 |
| 22 | SIO2 | 140.79 |
| 23 | TIO2 | 72.49 |
| 24 | SIO2 | 112.93 |
| 25 | TIO2 | 71.26 |
| 26 | SIO2 | 116.06 |
| 27 | TIO2 | 78.12 |
| 28 | SIO2 | 116.27 |
| 29 | TIO2 | 133.48 |
| 30 | SIO2 | 86.5 |
| 31 | TIO2 | 53.86 |
| 32 | SIO2 | 109.19 |
| 33 | TIO2 | 63.7 |
| 34 | SIO2 | 90.45 |
| 35 | TIO2 | 34.73 |
| 36 | SIO2 | 93.88 |
| 37 | TIO2 | 52.85 |
| 38 | SIO2 | 67.08 |
| 39 | TIO2 | 46.52 |
| 40 | SIO2 | 86.74 |
| 41 | TIO2 | 303.15 |
| 42 | SIO2 | 57.54 |
| 43 | TIO2 | 52.91 |
| 44 | SIO2 | 199.56 |
| 45 | TIO2 | 62.39 |

TABLE 1-continued

Layer configuration in a dielectric layer

| | Glass | (nm) |
|---|---|---|
| 46 | SIO2 | 66.77 |
| 47 | TIO2 | 32.86 |
| 48 | SIO2 | 81.96 |
| 49 | TIO2 | 30.51 |
| 50 | SIO2 | 95.01 |
| 51 | TIO2 | 97.76 |
| 52 | SIO2 | 161.82 |
| | Air | |

EXAMPLE 2

The film thickness data of the dielectric multilayer used in Example suitably for a second optical element are shown in Table 2.

Figure 20:
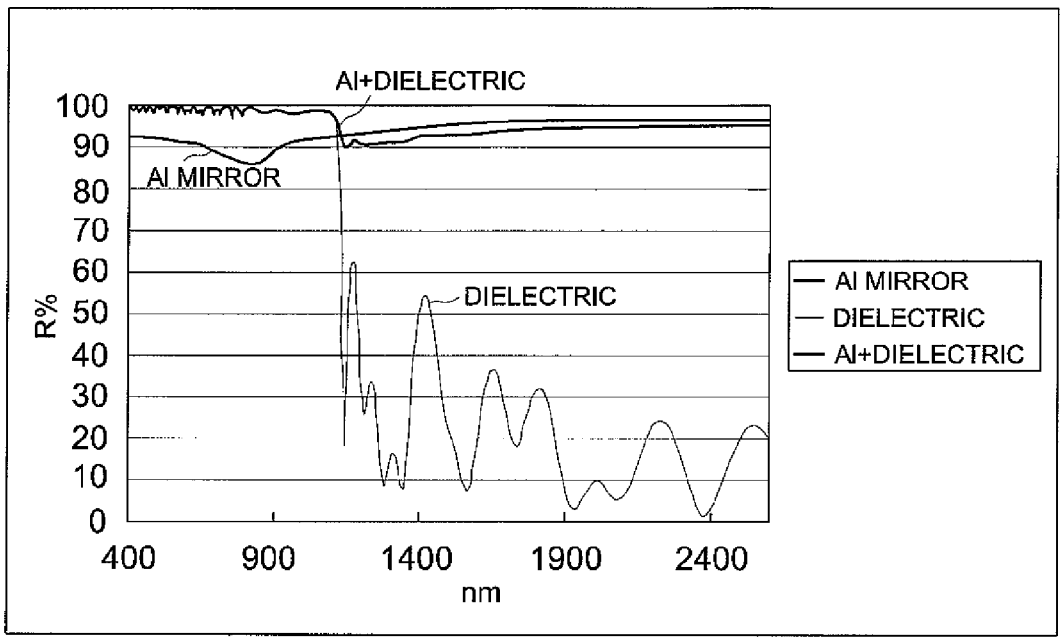
FIG. 20 is a drawing showing the reflection characteristic at the time that light was made to enter with an incidence angle of 20 degrees, in the example in which a metal vapor-deposited film made from a material of Al and the dielectric multilayer were formed.
Figure 21:
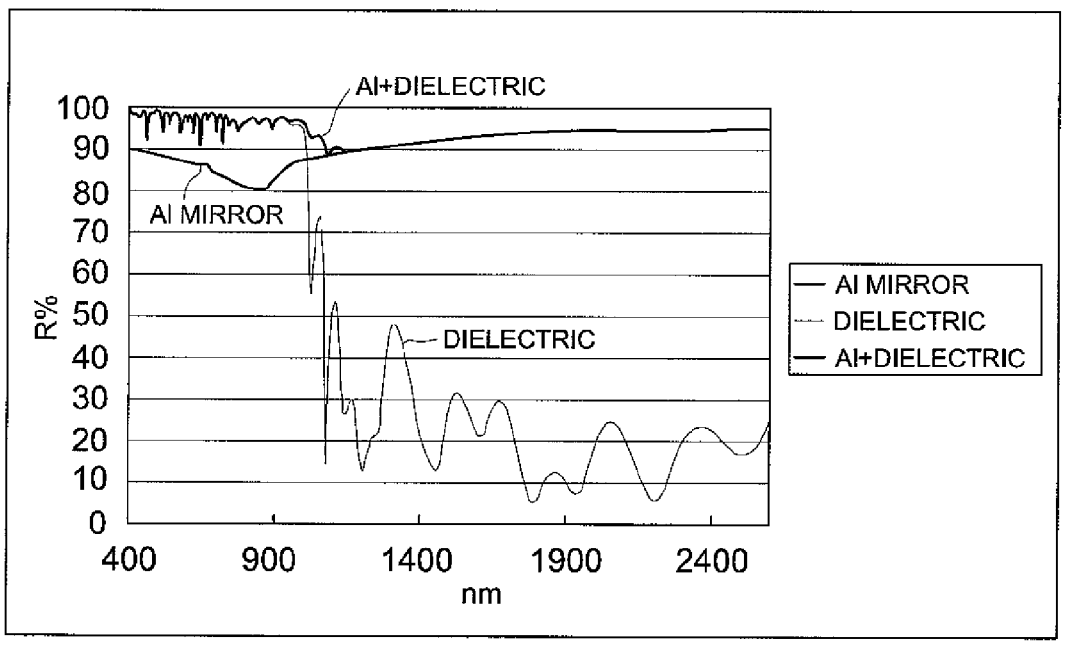
FIG. 21 is a drawing showing the reflection characteristic at the time that light was made to enter with an incidence angle of 50 degrees, in the example in which a metal vapor-deposited film made from a material of Al and the dielectric multilayer were formed.

In the example in which the dielectric multilayer shown in Table 2 and a metal vapor-deposited film made from a material of Al were formed on a light entering surface of a glass-made base plate in this order from the incidence side, FIG. 20 is a diagram showing the reflection characteristic at the time that light was made to enter with an incidence angle of 20 degrees. In the same example, FIG. 21 is a diagram showing the reflection characteristic at the time that light was made to enter with an incidence angle of 50 degrees.

TABLE 2

Design values

| Glass | |
|---|---|
| AL | 150 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 74.95 |
| SIO2 | 122.85 |
| TIO2 | 74.95 |
| SIO2 | 122.85 |
| TIO2 | 74.95 |
| SIO2 | 122.85 |
| TIO2 | 74.95 |
| SIO2 | 122.85 |
| TIO2 | 74.95 |
| SIO2 | 122.85 |

TABLE 2-continued

Design values

| Glass | |
|---|---|
| TIO2 | 74.95 |
| SIO2 | 122.85 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 109.54 |
| SIO2 | 179.55 |
| TIO2 | 109.54 |
| SIO2 | 179.55 |
| TIO2 | 109.54 |
| SIO2 | 179.55 |
| TIO2 | 109.54 |
| SIO2 | 179.55 |
| TIO2 | 109.54 |
| SIO2 | 179.55 |
| TIO2 | 109.54 |
| SIO2 | 179.55 |
| Air | |

In any embodiment, in combination of the dielectric multilayer and the metal vapor-deposited film (thickness of 150 nm), it was able to provide a reflectance ratio of 90% or more for a wide band. Furthermore, in the case that an incidence angle is 20 degrees, the dielectric multilayer of this embodiment has a band having a reflectance ratio of 6% or less at three position in a range of a wavelength of 1.9 μm to 2.4 μm, and in the case that an incidence angle is 50 degrees, the dielectric multilayer of this embodiment has a band having a reflectance ratio of 8% or less at three position in a range of a wavelength of 1.7 μm to 2.2 μm. Accordingly, the number of layers can be suppressed and incidence angle characteristic can be made good.

Incidentally, With regard to the first optical element, onto its light entering surface side, a metal such as Al, etc can be deposited by a well-known method so as to form a reflective film. Further, the dielectric multilayer indicated in Table 1 and a metal vapor-deposited film may be provided on a light entering surface side of a base plate in this order.

As mentioned above, although the present invention has been explained with reference to embodiments, the present invention should not be interpreted as being limited to the above-mentioned embodiment, and of course, modification and improvement can be made suitably.

The invention claimed is:
1. A sunlight collecting system to collect light by reflecting sunlight and to generate energy, comprising:
a plurality of first optical elements for a primary reflection to reflect sunlight primarily; and a second optical element for a secondary reflection to collect the primarily reflected light from the plurality of first optical elements and to reflect the collected light;

wherein the first optical element has a base plate and a reflective film formed on a surface of the base plate opposite to a sunlight-entering surface, and the second optical element has a base plate and a reflective film formed on a sunlight-entering surface of the base plate.

2. The sunlight collecting system described in claim 1, wherein the reflective film of the second optical element is arranged to face downward in terms of a gravity direction.

3. The sunlight collecting system described in claim 1, wherein the reflective film of the first optical element includes a metal vapor-deposited film.

4. The sunlight collecting system described in claim 1, wherein the reflective film of the first optical element includes a metal vapor-deposited film and a dielectric multilayer film, and the dielectric multilayer film is arranged at a sunlight-entering side than the metal vapor-deposited film.

5. The sunlight collecting system described in claim 1, wherein the reflective film of the second optical element includes at least a dielectric multilayer film, and the dielectric multilayer film has at least one or more bands in which a reflectance ratio is 50% or less in a range of 0.8 μm to 2.4 μm in wavelength of an entering light.

6. The sunlight collecting system described in claim 1, wherein the reflective film of the second optical element includes a metal vapor-deposited film and a dielectric multilayer film, and the dielectric multilayer film is arranged at a sunlight entering side than the metal vapor-deposited film.

7. The sunlight collecting system described in claim 1, wherein the base plate of the first optical element is made of plastic or glass, and the base plate of the second optical element is made of ceramic or glass.

* * * * *